US006780232B2

United States Patent
Treadway

(10) Patent No.: US 6,780,232 B2
(45) Date of Patent: Aug. 24, 2004

(54) COATING COMPOSITION YIELDING ABRASION-RESISTANT TINIABLE COATING

(75) Inventor: Gerald D. Treadway, Penngrove, CA (US)

(73) Assignee: The Walman Optical Company, Minneapolis, MN (US)

( * ) Notice: Subject to any disclaimer, the term of this patent is extended or adjusted under 35 U.S.C. 154(b) by 0 days.

(21) Appl. No.: 09/378,318

(22) Filed: Aug. 20, 1999

(65) Prior Publication Data

US 2002/0193479 A1 Dec. 19, 2002

(51) Int. Cl.$^7$ ............................................. B32B 13/12
(52) U.S. Cl. ..................... 106/287.12; 106/287.13; 106/287.14; 428/451; 524/265; 524/266
(58) Field of Search ................ 106/287.12, 287.13, 106/287.14; 428/451; 524/265, 266

(56) References Cited

U.S. PATENT DOCUMENTS

| | | | |
|---|---|---|---|
| 2,942,019 A | 6/1960 | Pike et al. ................ 260/448.2 |
| 3,166,527 A | 1/1965 | Ender ........................ 260/33.2 |
| 3,291,775 A | 12/1966 | Holm .......................... 260/47 |
| 3,591,408 A | 7/1971 | Marzocchi et al. ............ 117/54 |
| 3,837,876 A | 9/1974 | Mayuzumi et al. ... 106/287 SB |
| 3,961,977 A | 6/1976 | Koda et al. ............ 106/287 SB |
| 3,986,997 A | 10/1976 | Clark ........................ 260/29.2 |
| 4,027,073 A | 5/1977 | Clark .......................... 428/412 |
| 4,029,842 A | 6/1977 | Yoshida et al. .............. 428/334 |
| 4,098,840 A | 7/1978 | Yoshida et al. .............. 260/827 |
| 4,196,014 A | 4/1980 | Taniyama et al. ....... 106/287.13 |
| 4,208,503 A | 6/1980 | Martin ........................ 528/14 |
| 4,241,116 A | 12/1980 | Taniyama et al. ............ 427/385 |
| 4,378,250 A | 3/1983 | Treadway et al. ...... 106/287.11 |
| 4,426,431 A | 1/1984 | Harasta et al. ................. 430/14 |
| 4,623,676 A | 11/1986 | Kistner ........................ 522/15 |
| 4,642,266 A * | 2/1987 | Funaki et al. ................ 428/412 |
| 4,668,601 A | 5/1987 | Kistner ........................ 430/162 |
| 4,719,146 A | 1/1988 | Hohage et al. .............. 428/331 |
| 4,855,180 A | 8/1989 | Kawamura .................. 428/328 |
| 4,895,767 A | 1/1990 | Mori et al. .................. 428/447 |
| 5,221,560 A | 6/1993 | Perkins et al. .............. 427/515 |
| 5,314,947 A | 5/1994 | Sawaragi .................... 524/780 |
| 5,314,980 A * | 5/1994 | Morrison ..................... 528/19 |
| 5,367,019 A | 11/1994 | Sawaragi .................... 524/780 |
| 5,385,955 A | 1/1995 | Tarshiani et al. ............. 522/31 |
| 5,789,082 A | 8/1998 | Treadway .................... 428/412 |
| 5,866,262 A | 2/1999 | Galic et al. ................. 428/447 |

* cited by examiner

Primary Examiner—Peter D. Mulcahy
(74) Attorney, Agent, or Firm—Fredrikson & Byron, P.A.

(57) ABSTRACT

A coating composition based upon at least partially hydrolyzed epoxy-functional alkoxy silanes and having particular utility in forming tintable, abrasion resistant coatings on lenses. Incorporation in the composition of a non-hydrolyzed epoxy-functional alkoxy silane provides a desired reduction in viscosity. Incorporation in the composition of a polyether surfactant provides a cured coating of the composition with increased tintability.

21 Claims, No Drawings

COATING COMPOSITION YIELDING ABRASION-RESISTANT TINIABLE COATING

FIELD OF THE INVENTION

This invention relates to the field of transparent coatings for transparent objects such as eyeglass lenses, and refers particularly to a coating compositions having low viscosities and coating compositions producing abrasion-resistant coatings exhibiting high tintability.

BACKGROUND OF THE INVENTION

Transparent plastic materials such as eyeglass lenses are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly (methylmethacrylate), and these also can be scratched or abraded.

Various coatings have been proposed for eyeglasses and other transparent plastic materials to reduce their propensity to become scratched and abraded. One such composition is shown in U.S. Pat. No. 4,378,250 (Treadway, et al.) granted Mar. 29, 1983. Other coatings are shown in U.S. Pat. No. 5,367,019 (Sawara), U.S. Pat. No. 4,855,180 (Kawamura), U.S. Pat. No. 4,895,767 (Mori et al.) and U.S. Pat. No. 4,719,146 (Hohage et al.) Besides being abrasion resistant, coatings for eyeglass lenses should also be capable of being tinted by treatment with a dye which becomes incorporated in the coating. As a general observation, the tintability of a coating tends to decrease as its hardness and scratch resistance increases, and vice-versa.

Harasta, et al. U.S. Pat. No. 4,426,431 discusses a coating composition referred to as a "hybrid" system because it employs a solution, in a solvent such as propylene carbonate, of an epoxy compound and a cationic initiator for it, and an acrylic compound and a free radical initiator for it. In general, coating compositions suitable for use in forming protective transparent coatings on eyeglass lenses and the like are provided in solution in a volatile solvent, the solvent serving as a low viscosity vehicle to enable the coating composition to be uniformly spread upon a surface and to accept dye treatments. The solvents that are employed are for the most part organic, and must be used and disposed of carefully.

Perkins et al. U.S. Pat. No. 5,221,560 describes a coating composition containing a polyfunctional, polymerizable non-acrylate functional ether, a radiation-sensitive initiator, and colloidal silica in an amount providing at least 25% by weight of the total solids of the composition, the silica being reacted with a small amount of a hydrolyzed acryloxy-functional or glycidoxy-functional silane.

Treadway, PCT Publication WO 98/39390 describes a coating composition that is substantially free of volatiles and that employs a hydrolysis product of an epoxy-functional silane and also a polymerizable ether. The latter is said to impart tintability to cured coatings of the composition.

U.S. Pat. No. 5,866,262 (Galic et al.) teaches the use of fully hydrolyzed epoxy-functional and imine-functional alkoxysilanes in coating compositions for eyeglass lenses, whereas the previously mentioned U.S. Pat. No. 4,378,250 (Treadway, et al.) teaches that such hydrolysis of epoxy-and imine-functional alkoxysilanes may be less than stoichiometric.

Coating compositions of the type used to provide coatings on such substrates as polycarbonate eye glass lenses desirably are of low viscosity. Moreover, as noted earlier, they desirably are capable, upon curing, of forming surfaces that on the one hand are hard and scratch-resistant and on the other hand are tintable, that is, are capable of readily accepting tinting dyes.

SUMMARY OF THE INVENTION

The present invention provides coating compositions yielding cured coatings that exhibit excellent abrasion-resistance and that readily accept tinting dyes. The compositions preferably are of low viscosity and most preferably are substantially free of volatile solvents.

In one embodiment, a composition of the invention comprises the hydrolysis product of an epoxy-functional alkoxy silane, a curing agent therefor, an ethylenically unsaturated monomer and also an unhydrolyzed epoxy-functional alkoxy silane. The ethylenically unsaturated monomer component desirably comprises an acrylic monomer, preferably an acrylic monomer having an acrylic functionality of not more than two.

I have found that inclusion of an unhydrolyzed epoxy-functional alkoxy silane in the coating composition enables a substantial reduction in the viscosity of the composition to be achieved, without loss of abrasion resistance. Amounts of the unhydrolyzed silane sufficient to significantly reduce viscosity of the coating composition up to about 50% by weight, solids basis, are used.

It has also been found that the tintability of coatings derived from a composition comprising the hydrolysis product of an epoxy-functional alkoxy silane, a curing agent therefor and an ethylenically unsaturated monomer, can be substantially improved by incorporating in the composition a non-reactive polyether surfactant.

Hence, the invention in another embodiment relates to a coating composition comprising the hydrolysis product of an epoxy-functional alkoxy silane, a curing agent therefor, an ethylenically unsaturated monomer, and a non-reactive polyether surfactant in sufficient quantity to improve tintability of a cured coating made from the composition. Tintability is so improved by the addition of the polyether surfactant that the coating composition preferably is free of vinyl ethers and reactive non-silane epoxy ingredients. However, as required, the incorporation in the coating composition of non-silane glycidyl ethers may further improve tintability.

The coating compositions of the invention preferably include a cationic initiator such as a diaryl iodonium hexafluoroantimonate and a free radical initiator to initiate polymerization of the ethylenically unsaturated coating components. The composition may include one or more additional epoxy-functional compounds, acrylic monomers, and other ingredients, including colloids, although preferably the composition is free of silica and most preferably is substantially free of colloids.

DESCRIPTION OF THE PREFERRED EMBODIMENTS

In coating compositions of the invention, the epoxy functional alkoxy silane precursor of the at least partially hydrolyzed polymerizable ingredient is preferably an epoxy-alkylalkoxysilane of the following structure:

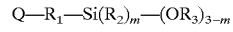

wherein $R_1$ is a $C_1$–$C_{14}$ alkylene group, $R_2$ and $R_3$ independently are $C_1$–$C_4$ alkyl groups and is a glycidoxy or epoxycyclohexyl group, and m is 0 or 1. The alkoxy groups are at least partially hydrolyzed to form silanol groups with the release of the $R_3OH$ alcohol, and some condensation of the silanol groups occurs. Epoxy reactivity is preserved, however. Many epoxy-functional alkoxysilanes are suitable as hydrolysis precursors, including glycidoxymethyl-trimethoxysilane, glycidoxymethyltriethoxysilane, glycidoxymethyl-tripropoxysilane, glycidoxymethyl-tributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyl-triethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyl-tripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy) butyl-triethoxysilane, (3,4-epoxycyclohexyl)-butyl-tripropoxysilane, and (3,4-epoxycyclohexyl)butyl-tributoxysilane.

A particularly preferred epoxyalkylalkoxysilane is γ-glicidoxypropyl trimethoxy silane due to its wide commercial availability.

Hydrolysis of the epoxy-functional alkoxysilane precursor may occur in an acidic environment, and reference is made to U.S. Pat. No. 4,378,250, the teachings of which are incorporated herein by reference. Hydrolysis of the alkoxy groups liberates the associated alcohol (which may be stripped off) to form silanol groups; these, in turn, are relatively unstable and tend to condense spontaneously. Hydrolysis of the alkoxysilane may but need not be complete, and preferably, the alkoxysilane is reacted with a stoichiometricly sufficient quantity of water to hydrolyze at least 50% of the alkoxy groups and most preferably from about 60% to about 70% of the alkoxy groups. For the hydrolysis of an epoxy-functional trialkoxy silane, good results have been obtained by reacting the silane with a stoichiometricly sufficient quantity of water to hydrolyze two-thirds of the alkoxy groups.

The at least partially hydrolyzed epoxy-functional silane is present in the coating compositions of the invention at a weight concentration (solids basis) of about 10% to about 75%, and preferably about 20% to about 50%.

In addition to the partially or fully hydrolyzed epoxy-functional alkoxy silane, as noted above, the composition desirably includes an effective amount up to about 50% by weight, solids basis, of a non-hydrolyzed, and suitable epoxy-functional alkoxy silanes include the silanes listed above. The non-hydrolyzed epoxy-functional alkoxy silane desirably is present in an amount not less than about 10%, preferably at least about 20%, and most preferably from about 40% to about 50% by weight, solids basis. Preferably, the epoxy-functional alkoxy silane that is included as the non-hydrolyzed component also is employed to make the hydrolyzed component. It should be understood that the hydrolyzed and non-hydrolyzed components may be different and each may utilize one or a blend of different epoxy-functional alkoxy silanes, as desired.

Useful cationic initiators for the purposes of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts such as diphenyliodonium chloride and diaryl iodonium hexafluoroantimonate, the latter being preferred. The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978, U.S. Pat. No. 4,101,513, "Catalyst For Condensation Of Hydrolyzable Silanes And Storage Stable Compositions Thereof," by F. J. Fox et al. issued Jul. 18, 1978; and U.S. Pat. No. 4,161,478, "Photoinitiators," by J. V. Crivello issued Jul. 17, 1979, the disclosures of which are incorporated herein by reference.

Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference. Preferred cationic initiators for use in the compositions of this invention are the salts of Group VIa elements and especially the sulfonium salts, and also the Group VIIa elements, particularly the diaryl iodonium hexaflurorantimonates. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

A wide variety of ethylenically unsaturated monomers (including oligomers) can be employed in the coating composition of the invention, and acrylic monomers and oligomers, particularly those having acrylic functionalities of not greater than two, are preferred. Useful acrylic compounds for improving adhesion to polycarbonate substrates include both mono and di-functional monomers, but other or additional polyfunctional acrylic monomers may also be included.

Examples of monofunctional acrylic monomers include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers, including both difunctional and tri and tetrafunctional monomers, include neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, 1,5-pentanediol dimethacrylate, and the like. The acrylic-functional monomers and oligomers desirably are employed at a weight concentration of at least about 10% by weight, preferably from about 10% to about 50%, and most preferably from about 10% to about 25%, all on a solids basis.

As initiators for the ethylenically unsaturated monomers, photoactivated free-radical initiator are preferred, although thermally activated free radical initiators may also be used. Useful photoinitiators for this purpose are the haloalkylated aromatic ketones, chloromethylbenzophenones, certain benzoin ethers, certain acetophenone derivatives such as diethoxyacetophenone and 2-hydroxy-2-methyl-1-phenylpropan-1-one. A preferred class of free-radical photoinitiators is the benzil ketals, which produce rapid cures. A preferred photoinitiator is α,α-dimethoxy-α-phenyl acetophenone (Iragacure™ 651, Ciba-Geigy, disclosed in U.S. Pat. Nos. 3,715,293 and 3,801,329). The most preferred photoinitiator, in accordance with this invention, is 2-hydroxy-2-methyl-1-phenylpropane-1-one (Darocure™ 1173, Ciba-Geigy Corporation). Specific examples of photoinitiators include ethyl benzoin ether, isopropyl benzoin ether, dimethoxyphenyl acetophenone, diethoxy acetophenone, and benzophenone.

In a preferred embodiment, the coating composition is substantially free of volatile solvents and also preferably is free of silica and free of other colloids.

The surfactants useful in the present invention to promote tintability are non-reactive polyethers, and may be water soluble, water dispersible or water insoluble. As used here, "non-reactive" means that the polyether does not significantly participate in the curing reaction involving the epoxy-functional alkoxy silane or the ethylenically unsaturated monomers. A variety of non-reactive polyethers can be employed, including the various poly (alkylene glycol) and poly (alkylene oxide) surfactants, and are chosen for their ability to significantly improve tintability. Preferred polyethers include polyalkylene oxide modified polymers such as polyalkylene oxide modified siloxanes (including polyalkylene oxide modified dimethylsiloxanes and polyalkylene oxide modified heptamethylsiloxanes), the alkoxy polyalkylene oxyethanols, and the substituted polyglycols such as nonylphenol polyethylene glycol. The polyalkylene oxide modified siloxanes may be in liquid or solid form.

Polyalkylene oxide modified polydimethylsiloxanes, as an example, may have the formula:

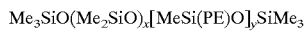

where Me is methyl and PE is —(CH$_2$)$_3$O(EO)$_m$(PO)$_n$Z. Here, These surfactants are referred to as "AP" (alkyl-pendant) types. Other polyalkylene oxide modified siloxanes may have the general formula (MeSi)$_{y-2}$[(OSiMe$_2$)$_{x/y}$O—PE]$_y$, where PE is —(EO)$_m$(PO)$_n$R, R being lower alkyl. The latter surfactants are referred to as the "AEB" (alkoxy endblocked) typeIn these general formulas, EO represents ethyleneoxy, PO represents 1,2-propyleneoxy, Z is H or lower alkyl, and x, y, m and n can vary as desired.

A series of polyalkylene oxide modified siloxane surfactants as thus described are available from Witco Corporation under its registered trademark SILWET. Alkoxypolyalkylene oxyethanols, and the substituted polyglycols such as nonylphenol polyethylene glycol, are generally available from Union Carbide Corporation under its registered trademark TERGITOL.

The amount of surfactant to be used in a coating composition is the amount which provides the desired tintability to cured coatings derived from the composition, and this amount may range from a minimum amount—usually a percent or two by weight—that provides noticeable improvement in tintability up to about 10% by weight or more. Amounts of surfactant in the range of about 1% to about 10% by weight of the composition are usually appropriate, and surfactant concentrations of about 4% have given good results.

The invention may be more readily understood by reference to the following illustrative, non-limiting examples. In these examples, tintability is measured as follows: A coated and cured sample is immersed in BPI Black Dye (1% Transmission, Brain Power Inc.) at 95° C.–100° C. for 15 minutes and then rinsed with water and dried. The transmissivity T of the sample is measured spectrophotometrically, and tintability is reported as percentage transmissivity. Resistance to abrasion may be measured by abrading the coated surface of a transparent substrate under predetermined conditions and measuring the haze that is formed as a reduction in light transmissivity. One such testing apparatus is referred to as a Taber Abrader, a product of Byk-Gardner. Abrasion resistance testing with this equipment may be performed in accordance with ASTM D 1044-78. The particular equipment employed for testing coatings referred to below involved a model 5130 Taber abrader equipped with a CS10 abrasive wheel weighted at 500 grams.

EXAMPLE 1

Preparation of Epoxy Base Compositions

Epoxy base #1: A partially hydrolyzed epoxy—functional alkoxysilane is prepared by combining 236 g. of γ-glycidoxypropyltrimethoxysilane, 36 g of water and 0.5 ml of a 1% HCl solution and mixing for 16–20 hours. The resulting product is stripped of volatiles under vacuum.

Epoxy base #2: A second partially hydrolyzed epoxy—functional alkoxysilane is prepared by combining 246 g of epoxy cyclohexylethyltrimethoxysilane, 18 g of water, 20 g of ethanol and 0.2 g of an acidic functional ion exchange resin (CT 275, Purolite Corp.). The mixture is stirred at room temperature for 36–40 hours, and then is stripped of volatiles under vacuum.

EXAMPLE 2

Two coating compositions, labeled A and B, were prepared by blending together the following ingredients, amounts being given in grams. The viscosity of the compositions were measured and compositions were coated on polycarbonate lenses and UV cured using a medium pressure mercury bulb, 250 watts/inch. The coated lenses were subjected to the Taber Abrasion test described above.

| Ingredient | A | B |
|---|---|---|
| Butane diol diacrylate | 8.0 | 8.0 |
| Cyclohexane dimethanol divinylether | 2.0 | 2.0 |
| Trimethylolpropane triglycidyl ether | 7.5 | 7.5 |
| Epoxy base #1 | 9.5 | 5.5 |
| γ-glycidoxypropyltrimethoxysilane (not hydrolyzed) | 0.0 | 5.0 |
| Triarylsulfonium hexafluorphosphate (Cyracure 6990, Union Carbide) | 0.64 | 0.66 |
| Triarylsulfonium hexafluoroantimonate (Cyracure 6974, Union Carbide) | 0.64 | 0.64 |
| 2-hydroxy-2-methyl-1-phenyl propan-1-one (Darocurel1173, Ciba-Geigy Corporation) | 0.8 | 0.8 |
| Ebecryl 350 (silicone flow control agent, UCB Chemicals Corp.), | 0.4 | 0.4 |
| Viscosity, cps | 32 | 11 |
| Taber abrasion, % haze, 200 cycles | 11.3–11.6 | 11.3–11.4 |

Note should be made that the viscosity of Composition B was approximately one-third the viscosity of comparative Composition A

EXAMPLE 3

Three coating compositions, labeled C, D and E, were prepared by blending together the following ingredients, amounts being given in grams. The viscosity of the compositions were measured and compositions were coated, cured and tested as in Example 2.

| Ingredient | C | D | E |
|---|---|---|---|
| Epoxy base #1 | 7.6 | 7.6 | 7.6 |
| Hexane diol diacrylate | 6.4 | 5.2 | 6.4 |
| Cyclohexane dimethanol divinylether | 1.6 | 1.6 | 1.6 |
| Epoxy cyclohexylethyl trimethoxy silane (unhydrolyzed) | 6.0 | 2.0 | 4.0 |
| Epoxy base #2 | 0.0 | 4.0 | 2.0 |
| 1/1 mix of benzophenone and 1-hydroxy cyclohexylphenyl ketone | 0.6 | 0.5 | 0.6 |
| Mixed Triarylsulfonium Hexafluoroantimonate salts, 50% in Propylene Carbonate (UVI 6974, Union Carbide) | 1.2 | 1.2 | 1.2 |
| Ebecryl 350 | 0.2 | 0.2 | 0.2 |
| Viscosity, cps | 12.0 | 26 | 22 |
| Taber abrasion, 200 cycles, % haze | 9.8 | 9.4 | 9.6 |

EXAMPLE 4

A base composition was prepared by blending the following ingredients, amounts being given in grams:

| | |
|---|---|
| Glycidoxypropyltrimethoxysilane, partially hydrolyzed as in Example 1 | 36 |
| Glycidoxypropyltrimethoxysilane, unhydrolyzed | 50 |
| Hexane diol diacrylate | 15 |
| Pentaerythritol triacrylate | 5.0 |
| 1/1 mix of benzophenone and 1-hydroxy cyclohexylphenyl ketone | 1.8 |
| Diaryliodonium hexafluorophosphate (CD 1012, Sartomer Corp) | 4.0 |

The resulting base composition was divided into 10 g aliquots, and to each aliquot was added 0.4 g of one of the surfactants listed below, and the compositions were spin-coated on polycarbonate lenses and cured under UV light to form coating thicknesses in the range of 8 to 10 microns. The tintability of each lens was measured as described above.

| Surfactant | Water Solubility | Tint-ability (% T) |
|---|---|---|
| SILWET L-77 (polyalkylene oxide-modified heptamethyltrisiloxane, 700 mol. wt., AP type) | Dispersible | 27.7 |
| SILWET L-722 (polyalkylene oxide-modified dimethylsiloxane, 3000 mol. wt., AEB type) | Insoluble | 26.2 |
| SILWET L-7001 (polyalkylene oxide-modified dimethylsiloxane, 20,000 mol. wt., AP type) | Partially soluble | 26.2 |
| SILWET L-7500 (polyalkylene oxide-modified dimethylsiloxane, 3,000 mol. wt., AP type) | Partially soluble | 35.4 |
| SILWET L-7604 (polyalkylene oxide-modified dimethylsiloxane, 4,000 mol. wt., AP type) | Soluble | 26.4 |
| SILWET L-7607 (polyalkylene oxide-modified dimethylsiloxane, 1,000 mol. wt., AP type) | Soluble | 27.7 |
| SILWET L-7607 (polyalkylene oxide-modified dimethylsiloxane, 10,000 mol. wt., AP type) | Insoluble | 29.4 |
| TERGITOL S-3 (alkyloxypolyethyleneoxy-ethanol, mol. wt. 332) | Insoluble | 26.4 |
| TERGITOL S-5 (alkyloxypolyethyleneoxy-ethanol, mol. wt. 420) | Dispersible | 28.4 |
| TERGITOL S-7 (alkyloxypolyethyleneoxy-ethanol, mol. wt. 508) | Soluble | 29.0 |
| TERGITOL NP-4 (nonylphenol polyethylene glycol ether, mol. wt. 396) | Insoluble | 27.0 |
| TERGITOL NP-6 (nonylphenol polyethylene glycol ether, mol. wt. 484) | Dispersible | 33.5 |
| TERGITOL NP-6 (nonylphenol polyethylene glycol ether, mol. wt. 528) | Dispersible | 27.9 |
| TERGITOL NP-15 (nonylphenol polyethylene glycol ether, mol. wt. 880) | Soluble | 27.3 |

While preferred embodiments of the invention have been described, it should be understood that various changes, adaptations and modifications may be made therein without departing from the spirit of the invention or the scope of the appended claims.

What is claimed is:

1. A coating composition for forming a transparent, abrasion-resistant coating upon a substrate, comprising:
    a) the hydrolysis product of an epoxy-functional alkoxy silane,
    b) a curing agent for polymerizing epoxy compounds, the curing agent comprising a cationic photoinitiator,
    c) an ethylenically unsaturated monomer and photoactivated free-radical initiator therefore, and
    d) a viscosity-reducing amount up to 50% by weight, solids basis, of an unhydrolyzed epoxy-functional alkoxy silane,
    wherein the silanes of parts a) and d) are separately prepared and blended to form the composition and the composition is photocurable.

2. The coating composition of claim 1 wherein said ethylenically unsaturated monomer comprises an acrylic monomer.

3. The coating composition of claim 2 wherein said acrylic monomer has an acrylic functionality not greater than two.

4. The coating composition of claim 1 including an essentially non-reactive polyether surfactant in sufficient quantity to improve tintability of a cured coating formed from said composition.

5. The coating composition of claim 4 wherein said polyether surfactant is a siloxane.

6. The coating composition of claim 4 wherein said polyether surfactant is a polyalkaleneoxide siloxane.

7. The coating composition of claim 4 wherein said polyether surfactant is an alkoxy polyethylene oxyalkanol.

8. The coating composition of any one of claims 4–6 in which the surfactant is at least partially water soluble.

9. The coating composition of any one of claims 4–6 in which the surfactant is insoluble in water.

10. The coating composition of claim 1 wherein the epoxyfunctional alkoxy silanes of parts a) and d) are independently prepared from the group consisting of glycidoxymethyl-trimethoxysilane, glycidoxymethyltriethoxysilane, glycidoxymethyl-tripropoxysilane, glycidoxymethyl-tributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyltriethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyltripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyltriethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyltripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)butyl-tripropoxysilane, and (3,4-epoxycyclohexyl)butyl-tributoxysilane.

11. The coating composition of claim 1 wherein the silane of part a) is added in an amount sufficient to provide a concentration in the composition, based on weight (solids basis), of between about 10% to about 75%, and the silane of part d) is added in an amount sufficient to provide a concentration of not less than about 10%.

12. The coating composition of claim 1 wherein the ethylenically unsaturated monomers comprise acrylic monomers and oligomers having acrylic functionalities of not greater than two.

13. The coating composition of claim 12, wherein the monomers are selected from the group consisting of ethyl acrylate, butyl acrylate, 2-hydroxypropyl acrylate, cyclohexyl acrylate, 2-ethylhexyl acrylate, methyl methacrylate, ethyl methacrylate, neopentylglycol diacrylate, pentaerythritol triacrylate, 1,6-hexanediol diacrylate, trimethylolpropane triacrylate, tetraethylene glycol diacrylate, 1,3butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, and 1,5-pentanediol dimethacrylate.

14. The coating composition of claim 13 wherein the monomers are employed at a weight concentration in the composition from about 10% to about 25%, on a solids basis.

15. The coating composition of claim 1 wherein the cationic photoinitiator is selected from the group consisting of salts of Group Va elements, salts of Group VIa elements, and salts of Group VIIa elements.

16. The coating composition according to claim 15 wherein the cationic photoinitiator comprises a diaryl iodonium hexafluoroantimonate.

17. The coating composition according to claim 1 wherein the photoactivated free-radical initiator is selected from the group consisting of haloalkylated aromatic ketones, chloromethylbenzophenones, benzoin ethers, and acetophenone derivatives.

18. The coating composition according to claim 17 wherein the initiator is selected from the group consisting of diethoxyacetophenone, 2-hydroxy-2-methyl-1-phenylpropan-1-one, benzil ketals, α,α-dimethoxy-α-phenyl acetophenone, 2-hydroxy-2-methyl-1-phenylpropane-1-one, ethyl benzoin ether, isopropyl benzoin ether, dimethoxyphenyl acetophenone, diethoxy acetophenone, and benzophenone.

19. The coating compositions according to claim 1 wherein the composition is substantially free of volatile solvents.

20. The coating composition according to claim 1 wherein the composition can be cured using ultraviolet radiation.

21. The coating composition of claim 1 wherein the epoxyfuctional alkoxy silanes of parts a) and d) are independently prepared from the group consisting of glycidoxymethyl-trimethoxysilane, glycidoxymethyltriethoxysilane, glycidoxymethyl-tripropoxysilane, glycidoxymethyl-tributoxysilane, β-glycidoxyethyltrimethoxysilane, β-glycidoxyethyltriethoxysilane, β-glycidoxyethyltripropoxysilane, β-glycidoxyethyltributoxysilane, β-glycidoxyethyltrimethoxysilane, α-glycidoxymethyl-triethoxysilane, α-glycidoxyethyltripropoxysilane, α-glycidoxyethyltributoxysilane, γ-glycidoxypropyl-trimethoxysilane, γ-glycidoxypropyltriethoxysilane, γ-glycidoxypropyltripropoxysilane, γ-glycidoxypropyltributoxysilane, β-glycidoxypropyl-trimethoxysilane, β-glycidoxypropyl-triethoxysilane, β-glycidoxypropyltripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyltriethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyltripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)-butyl-tripropoxysilane, and (3,4-epoxycyclohexyl)butyl-tributoxysilane, and wherein the ethylenically unsaturated monomers are selected from the group consisting of ethyl acrylate, butyl acrylate, 2-hydroxypropyl acrylate, cyclohexyl acrylate, 2-ethylhexyl acrylate, methyl methacrylate, ethyl methacrylate, neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, and 1,5-pentanediol dimethacrylate, and wherein the cationic photoinitiator is selected from the group consisting of salts of Group Va elements, salts of Group VIa elements, and salts of Group VIIa elements, and wherein the photoactivated free-radical initiator is selected from the group consisting of diethoxyacetophenone, 2-hydroxy-2-methyl-1-phenylpropan-1-one, benzil ketals, α,α-dimethoxy-α-phenyl acetophenone, 2-hydroxy-2-methyl-1-phenylpropane-1-one, ethyl benzoin ether, isopropyl benzoin ether, dimethoxyphenyl acetophenone, diethoxy acetophenone, and benzophenone, and wherein the composition is substantially free of volatile solvents and can be cured using ultraviolet radiation.

* * * * *

UNITED STATES PATENT AND TRADEMARK OFFICE
CERTIFICATE OF CORRECTION

PATENT NO. : 6,780,232 B2
DATED : August 24, 2004
INVENTOR(S) : Treadway

It is certified that error appears in the above-identified patent and that said Letters Patent is hereby corrected as shown below:

Title page,
Item [54], Title, replace "COATING COMPOSITION YIELDING ABRASION-RESISTANT TINIABLE COATING" with -- COATING COMPOSITION YIELDING ABRASION-RESISTANT TINTABLE COATINGS --.

Column 10,
Line 36, replace "compositions" with -- composition --.

Signed and Sealed this

Fifth Day of April, 2005

JON W. DUDAS
*Director of the United States Patent and Trademark Office*